(12) United States Patent
Kurtgis

(10) Patent No.: US 6,604,712 B2
(45) Date of Patent: Aug. 12, 2003

(54) METHOD FOR TRANSFERRING A LOAD FROM AN AIRBORNE ROTORCRAFT TO AN ELEVATED STRUCTURE

(76) Inventor: Michael P. Kurtgis, 4101 SW. 47th Ave., Suite 106, Ft. Lauderdale, FL (US) 33314

( * ) Notice: Subject to any disclaimer, the term of this patent is extended or adjusted under 35 U.S.C. 154(b) by 0 days.

(21) Appl. No.: 09/864,689

(22) Filed: May 24, 2001

(65) Prior Publication Data

US 2002/0175246 A1 Nov. 28, 2002

(51) Int. Cl.[7] .................................................. B64D 1/12
(52) U.S. Cl. .................................. 244/137.4; 244/137.1
(58) Field of Search ................................ 244/137.4, 137.1, 244/137.2, 137.3, 140, 904, 17.15, 118.1; 182/150, 145, 7, 3, 142, 10, 11, 191–193, 13, 14

(56) References Cited

U.S. PATENT DOCUMENTS

| | | | | |
|---|---|---|---|---|
| 2,626,447 A | * | 1/1953 | Hunt | 182/150 |
| 2,700,781 A | * | 2/1955 | Smith | 244/1 TD |
| 2,966,878 A | * | 1/1961 | Feiser, Jr. | 116/212 |
| 3,081,121 A | * | 3/1963 | Campbell | 244/137.1 |
| 3,690,602 A | * | 9/1972 | Marsh | 244/137.4 |
| 4,134,634 A | * | 1/1979 | Baur et al. | 439/352 |
| 4,379,534 A | * | 4/1983 | Miller et al. | 102/354 |
| 4,478,312 A | * | 10/1984 | Kurtgis | 182/142 |
| 4,637,575 A | * | 1/1987 | Yenzer | 174/5 R |
| 4,673,059 A | * | 6/1987 | Kurtgis | 182/142 |
| 5,361,866 A | * | 11/1994 | Bell et al. | 182/3 |
| 5,417,304 A | * | 5/1995 | Kurtgis | 182/142 |
| 6,374,945 B1 | * | 4/2002 | Sherwood | 182/3 |

* cited by examiner

*Primary Examiner*—Charles T. Jordan
*Assistant Examiner*—Stephen A. Holzen
(74) *Attorney, Agent, or Firm*—Mark D. Bowen, Esq.; Stearns Weaver Miller Weissler Alhadeff & Sitterson, P.A.

(57) ABSTRACT

Improvements in rotorcraft external load operations are disclosed, including a method for transferring a load from an airborne rotorcraft to a structure while providing fall protection for the load and emergency release capabilities for the aircraft. A helicopter is adapted for carrying a load external to the aircraft fuselage which load may be restrained by an FAA approved safety restraint. The load is equipped with a safety harness and lanyard apparatus having first and second lanyards attached thereto. According to the method, a helicopter hovers next to a structure, and safe transfer is accomplished by: (1) attaching the free end of the first lanyard to the helicopter; (2) releasing any auxiliary safety restraint; (3) attaching the free end of the second lanyard to the structure; (4) detaching the first lanyard from the helicopter; and (5) effecting transfer of the load to the structure. When transferring from the structure to the helicopter the method is essentially reversed, however, the first lanyard is always used for connection to the helicopter and the second lanyard is used for connection to the structure. When transferring loads as described, fall protection is provided since the load is safely tethered to a load bearing structure at all times. In addition, a quick release mechanism simultaneously provides an emergency release that allows the aircraft to instantly pull away without placing the external load at risk of fall.

10 Claims, 9 Drawing Sheets

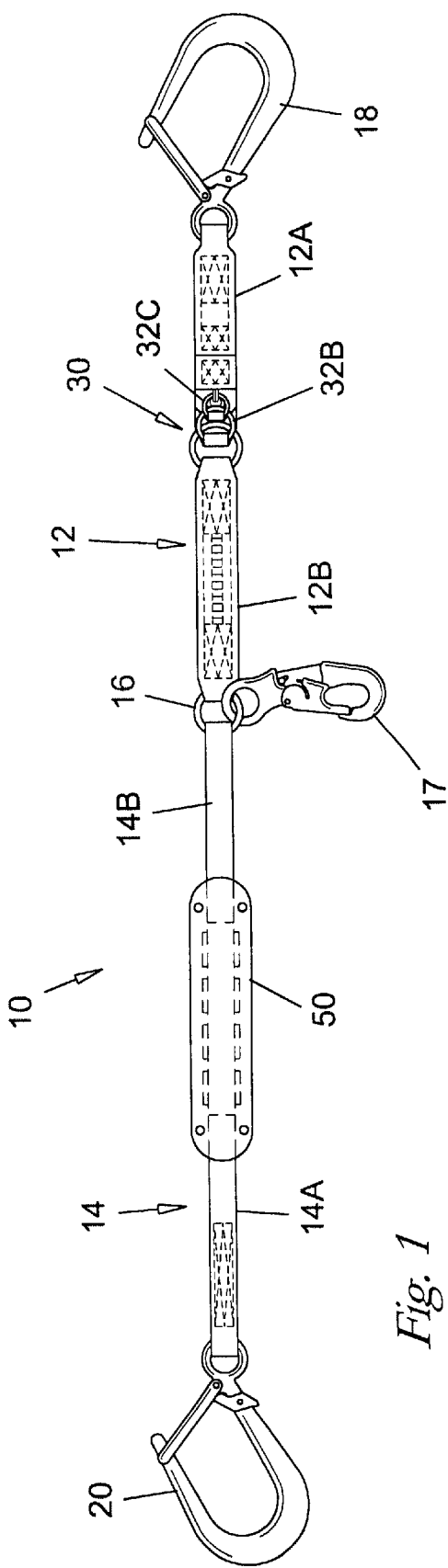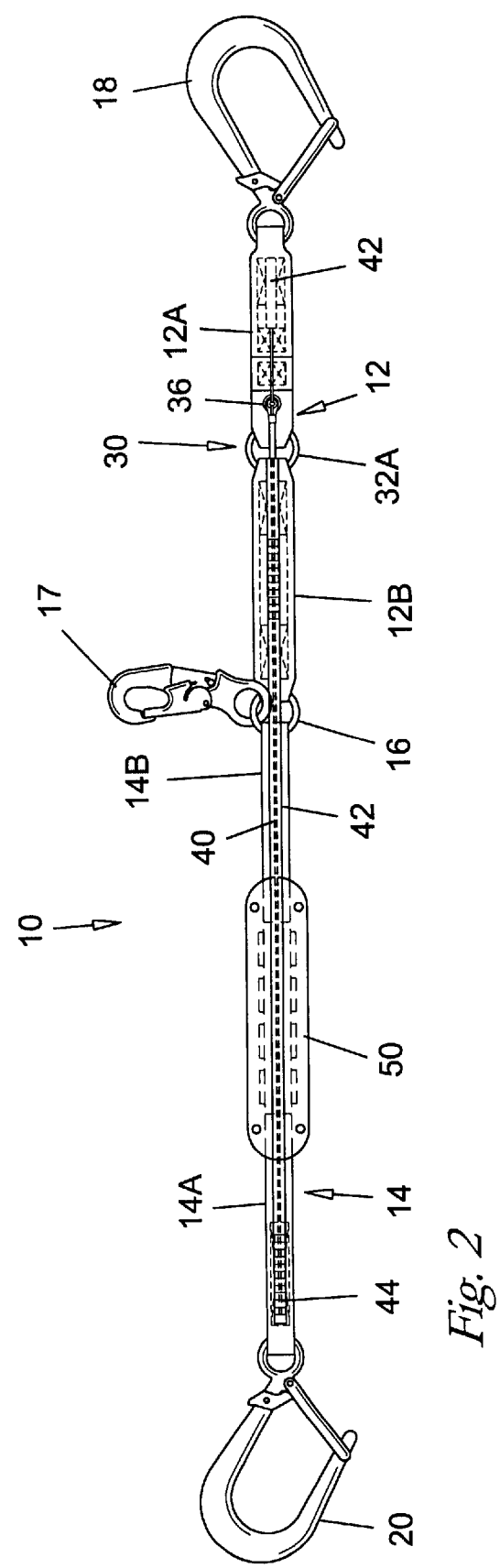
Fig. 1
Fig. 2

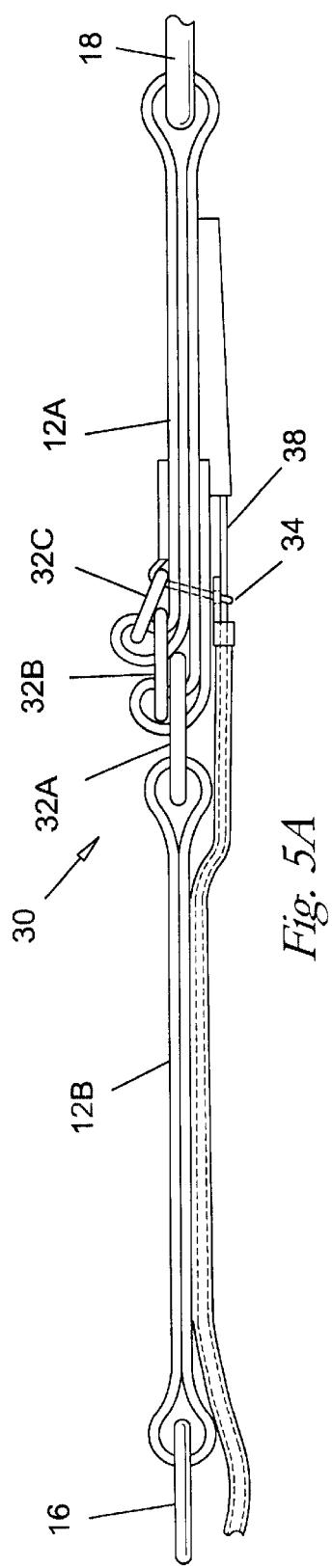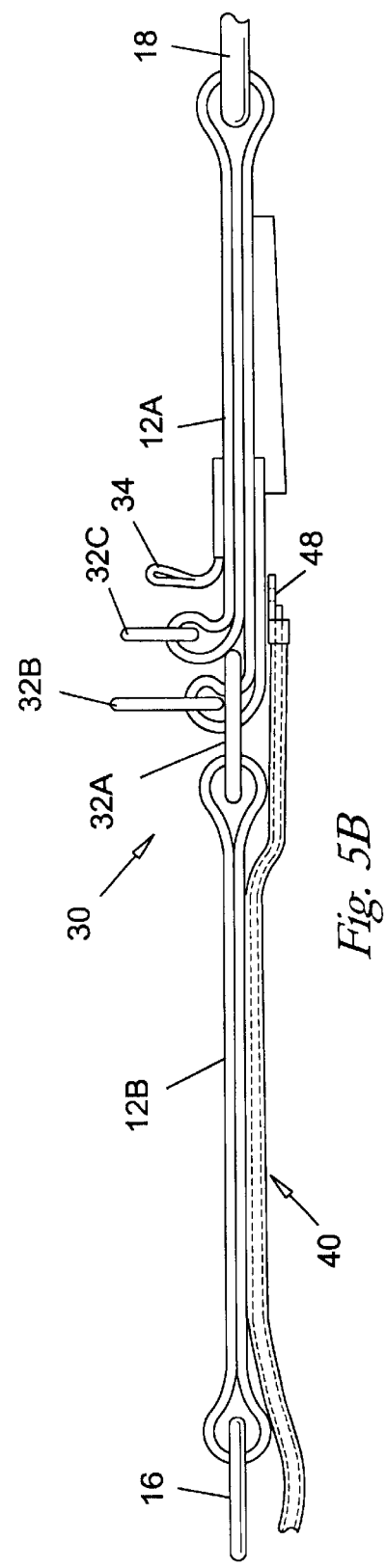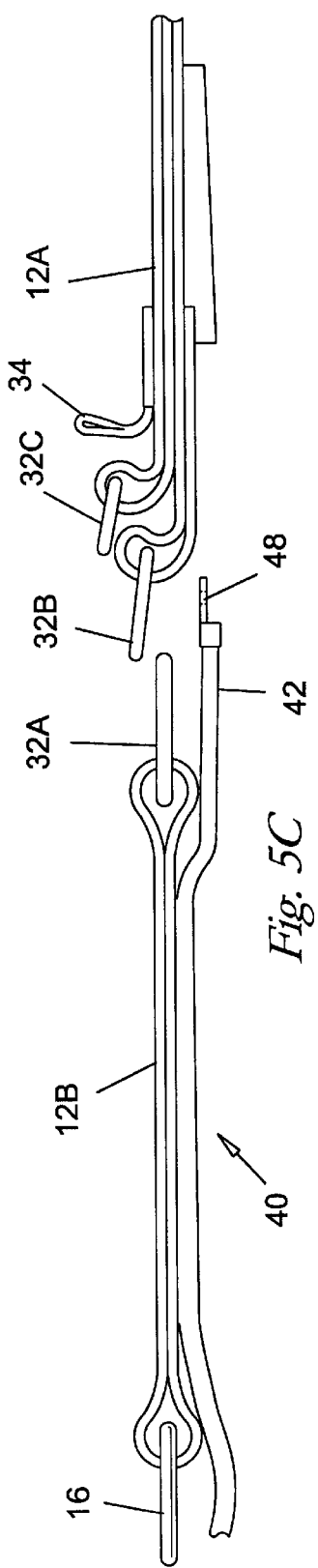

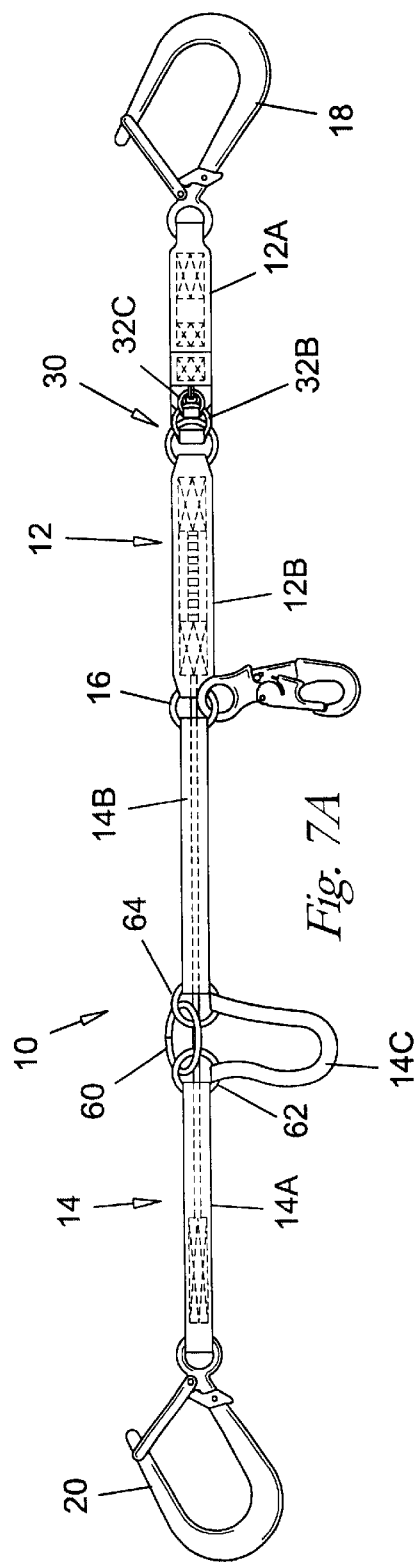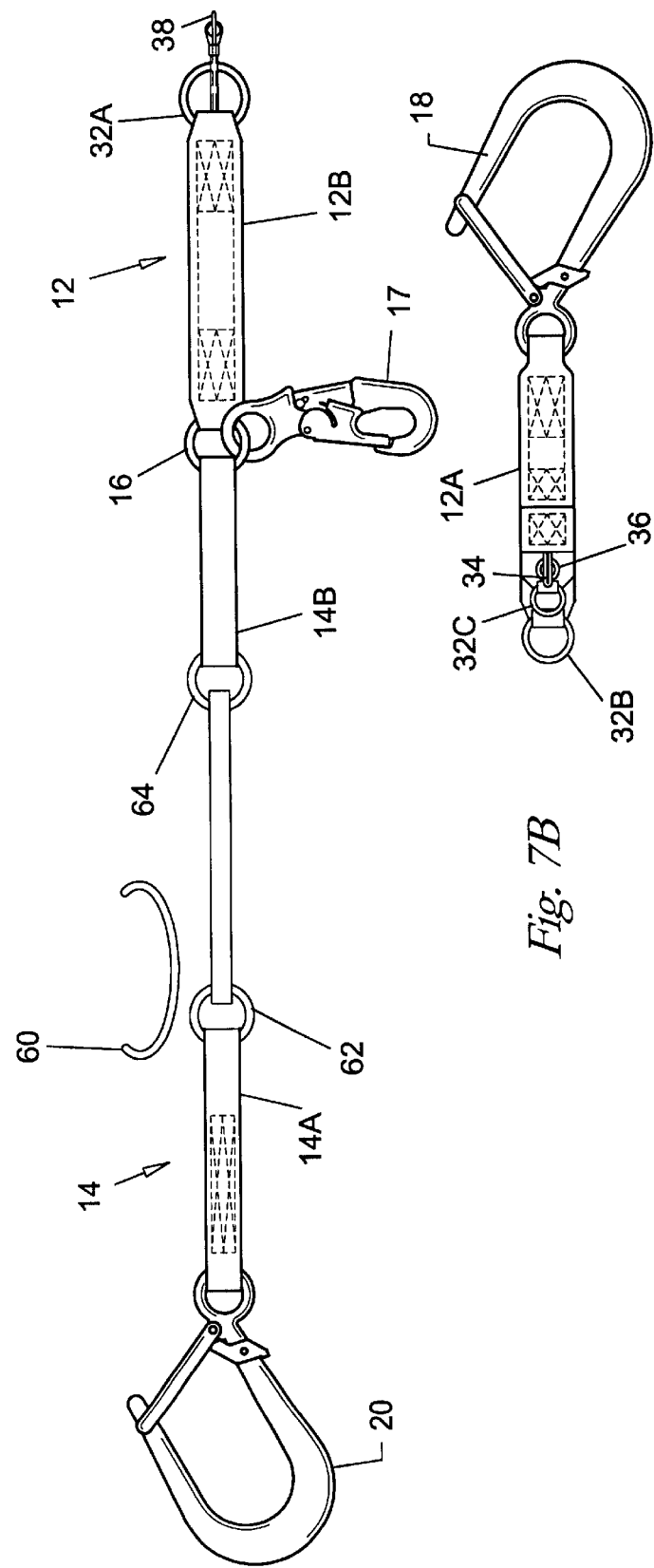
Fig. 7A
Fig. 7B

METHOD FOR TRANSFERRING A LOAD FROM AN AIRBORNE ROTORCRAFT TO AN ELEVATED STRUCTURE

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates generally to helicopter external load operations, and more particularly, to a method for transferring loads from an airborne helicopter to a structure or elevated component thereof, while simultaneously providing fall protection for the load and emergency release capabilities for the helicopter during the entire transfer.

2. Description of the Background Art

Rotary winged aircraft, such as helicopters, have been used in a wide variety of load transfer operations. Human external load operations (HEL) typically involve the transportation of a passenger suspended by a cable assembly under the helicopter. For example, helicopters equipped with load suspension points, or hooks, are capable of transporting loads in sling configuration wherein the load is suspended beneath the helicopter by a suspension apparatus. In other applications, helicopters carry cargo as well as human loads in various configurations external to the fuselage, such as on the skids or on skid-mounted platforms. For example, load-bearing platforms may be affixed to the helicopter to permit persons to operate external to the crew compartment. In other situations, a person may stand on one of the helicopter landing skids and operate in the external environment. HEL operations are commonly performed in transmission line maintenance and repair procedures in the electrical power industry, in the logging industry to access remote work sites, and for emergency rescue operations.

There are a number of basic devices, such as safety harnesses, for use in HEL operations. While the design of known safety devices varies, harnesses commonly consist of shoulder straps attached to a waist or chest belt. Some harnesses incorporate suspender style straps with a tether point-of-attachment on the front center of the chest/waist strap. Others comprise a Y-shaped design, where the shoulder straps aare connected to a strap extending vertically from the waist belt to form a three-point intersection. These harnesses are typically constructed of nylon webbing, and commonly include padding. The harness is designed to support the load (i.e., body weight) by the torso and shoulders of the user for suspension from a helicopter. Sit harnesses comprise another category of HEL devices. Also known as pelvic harnesses, bosun's seat, rescue harnesses or rigger's harnesses, these devices suspend the user in a seated posture. The basic design of a sit harness includes a waist belt connected to leg loops routed around the top of the thighs. The point of the tether attachment typically extends directly in front of the upper pelvic region. Full-body harnesses (FBHs) comprise a combination of sit harnesses and chest harnesses. While there are a number of variations of the basic design of the harness, all full-body harnesses include leg loops, shoulder straps, and either a waist belt, a chest belt, or both. The design of the full body harness is such that it assists the user in maintaining an upright, seated posture while suspended from the helicopter.

The present inventor has contributed significantly to advances in helicopter external load operations, particularly external human load operations. My U.S. Pat. No. 4,673,059 discloses a method and system for placing a load, which may consist of a combination of personnel and equipment, on or in proximity to components of an energized power transmission line. My U.S. Pat. No. 5,417,304 discloses a method for suspending a load from a rotary winged aircraft, such as a helicopter, using an apparatus that incorporates an emergency release activated by the suspended person. The methods disclosed in the '059 and '304 patents concern loads suspended beneath a helicopter, and do not provide for adequate fall protection for the external load.

In certain situations, however, it is necessary or desirable to transfer external loads from a hovering helicopter to a structure, such as a power transmission tower or an energized or de-energized power transmission line, ground wire, or other elevated point or structure. The methods disclosed in the '059 and '034 patents do not disclose suitable apparatus or methods for accomplishing the transfer of an external load from a hovering helicopter to an elevated structure while maintaining adequate safeguards for both the helicopter as well as the load. While the '304 patent discloses an emergency release, the system disclosed therein is a release-on-command type system that requires the suspended person to: (1) realize the existence of an emergency with the helicopter; and (2) manually activate the quick release to permit the helicopter to pull away. As should be apparent, the primary concerns in such human transfer applications involve maintaining adequate fall protection for the person during the transfer procedure without limiting helicopter operations, particularly the availability of emergency maneuvers and operations. It is critical to maintain full fall protection for the person through the entire transfer process, while, at the same not limiting the operation of the helicopter in emergency situations.

Currently, there is little standardization and a general lack of safety procedures practiced by those performing HEL operations. While regulations exist regarding the physical and structural characteristics of external load operations, little consideration has been given to the issue of humans as external loads. Federal Aviation Regulations applicable to rotorcraft operations, particularly those referring to human external loads, are found in Title 14 of the Code of Federal Regulations (CFR). The collection of FAA regulations found in 14 CFR is often referred to as the Federal Aviation Regulations (FARs). Within 14 CFR, part 133 pertains directly to rotorcraft external load operations and contains subparts that address applicability, certification rules, operating rules, and related requirements. In addition, part 27 requires that any external load attaching means must include a quick-release system to enable the pilot to release the external load quickly during flight. While the regulations address a number of areas, they provide no specific detail regarding the attachment method, human load transfer methods, or the structure or function of quick-release devices.

As a result of the lack of adequate safety methods there have been a number of rotorcraft accidents in connection with HEL operations. During the period from 1973 through 1995, it has been reported that there were 473 external load operations in which the helicopters were involved in either an accident or an incident. Of the 473 accidents listed, a substantial number involved operations using a sling line or sling load. Accordingly, it is recognized that the predominant cause of external load accidents involves problems with the sling line/load.

One common, yet inherently risky prior art method of transferring an external human load from a hovering helicopter to a structure, in a non-sling configuration, consists of bringing the helicopter to a hover immediately adjacent to a structure, wherein the helicopter may be stabilized by the placement of one or both skids (or wheels) on the structure, thereby allowing the person to step from the helicopter to the structure. This method, however, is significantly flawed in that, to avoid tethering the helicopter to the structure and thereby limiting the availability of emergency flight procedures (e.g. emergency pull-away), there exist periods of time during the transfer that the person is without fall protection, and consequently at substantial risk.

Thus, although HEL operations have been practiced, there remains a need for safer methods for transferring external loads from hovering helicopters. More particularly there exists a need for an improved method of safely transferring a load from a hovering helicopter to a structure, such as a power transmission tower or line or any other elevated structure, while simultaneously providing total fall protection for the human and preserving emergency operating procedures for the helicopter and crew by incorporating an emergency quick release.

BRIEF SUMMARY OF THE INVENTION

The present invention addresses the shortcomings of the background art by providing a method for transferring loads from an airborne rotorcraft while providing fall protection and emergency release capabilities for the aircraft. According to a preferred embodiment, a helicopter is adapted with an external platform configured for carrying a load external to the aircraft fuselage which load is restrained by an FAA approved safety restraint (e.g. seat belt). The load is equipped with a safety harness and a lanyard apparatus having first and second lanyards connected to the harness. The method is primarily directed to transfer of the load from the hovering aircraft to an adjacent structure. According to the method, a helicopter hovers next to a structure, and safe transfer is accomplished by: (1) connecting a safety lanyard apparatus, having first and second lanyards, to the load; (2) securing the load to the helicopter with a safety restraint (e.g. FAA approved restraint, seatbelt, or one of said lanyards) (3) attaching the free end of the first lanyard to the helicopter; (4) releasing any auxiliary safety restraint; (5) attaching the free end of the second lanyard to the structure; (6) detaching the first lanyard from the helicopter; and (7) transferring the load onto the structure. When transferring from the structure to the helicopter the method is essentially reversed, however, the first lanyard is always used for connection to the helicopter and the second lanyard is always used for connection to the structure. When transferring loads as described, fall protection is provided since the load is safely tethered to a load bearing structure at all times. In addition, the lanyard apparatus includes a quick release mechanism to simultaneously provide an emergency release that allows the aircraft to instantly pull away without placing the external load at risk.

Fall protection and emergency release capabilities are provided by an emergency release lanyard apparatus. The lanyard apparatus provides total fall protection for the load throughout the transfer process without restricting or otherwise limiting available emergency flight options/maneuvers by incorporating an emergency release that automatically activates on demand. In a preferred embodiment, the emergency release lanyard apparatus includes first and second load bearing lanyards, each terminating in a free end incorporating a hook. The competing concerns of fall protection (for the load) and on-demand emergency release (for the aircraft) are each enabled by providing the first lanyard with a quick release mechanism and the second lanyard with a limited slip mechanism.

Each lanyard is attached to a common point, such as a load bearing steel O-ring, which in turn is attached to a safety harness which secures the load. Each lanyard has a free end incorporating a double-action locking hook attached thereto. The first lanyard incorporates a quick-release mechanism, which, upon activation, results in the separation of the hook and free end portion thereof. The second lanyard incorporates a limited slip mechanism, which, upon application of a predetermined force thereon, activates the first lanyard's quick-release mechanism. The use of the emergency release lanyard apparatus according to the methods disclosed herein provides total fall protection during the transfer of a load from a hovering rotorcraft to a structure while providing an on-demand quick-release in emergency situations.

Accordingly, it is a primary object of the instant invention to provide improvements in the field of helicopter external load operations.

Another object of the present invention is to provide a system, including apparatus and methods, for providing comprehensive fall protection for a person or thing during transfer from a hovering rotorcraft to an elevated structure.

Still another object of the present invention is to provide a system that provides fall protection for a human external load engaged in an airborne transfer, before, during, and after transfer to a structure.

Yet another object of the present invention is to provide a system for HEL operations that provides an emergency release for a helicopter tethered to a structure while transferring human and non-human loads to or from the structure.

Still another object of the present invention is to provide a system for HEL operations that permits for release of a helicopter tethered to a structure while transferring a load to or from the structure, without the requirement for human action.

Another object of the present invention is to provide an apparatus for use in transferring loads from a hovering rotorcraft to a structure while providing total fall protection and incorporating an emergency release that does not require activation by the person being transferred.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 1 depicts a top view of an emergency release lanyard apparatus according to the present invention;

FIG. 2 depicts a bottom view thereof;

FIG. 5A is side detail view of a preferred embodiment emergency release mechanism for the lanyard apparatus in a connected configuration;

FIG. 5B is another side detail view thereof in a partially released configuration;

FIG. 5C is another side detail view thereof in a fully released configuration;

FIG. 7A is an alternate embodiment lanyard apparatus in a connected configuration with a breakaway link;

FIG. 7B is view thereof in a disconnected configuration;

DETAILED DESCRIPTION OF THE INVENTION

Figure 3:
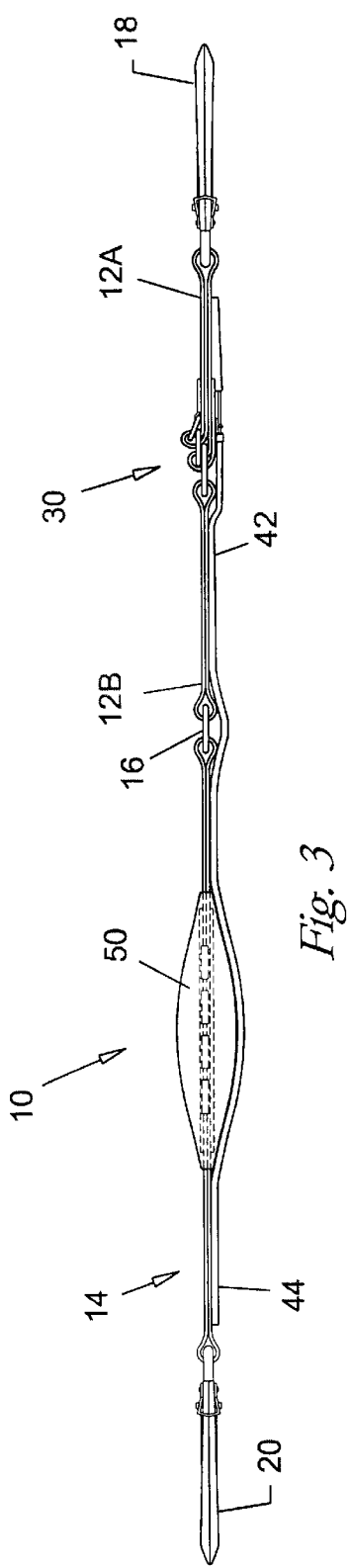
FIG. 3 depicts a side view thereof.
Figure 4:
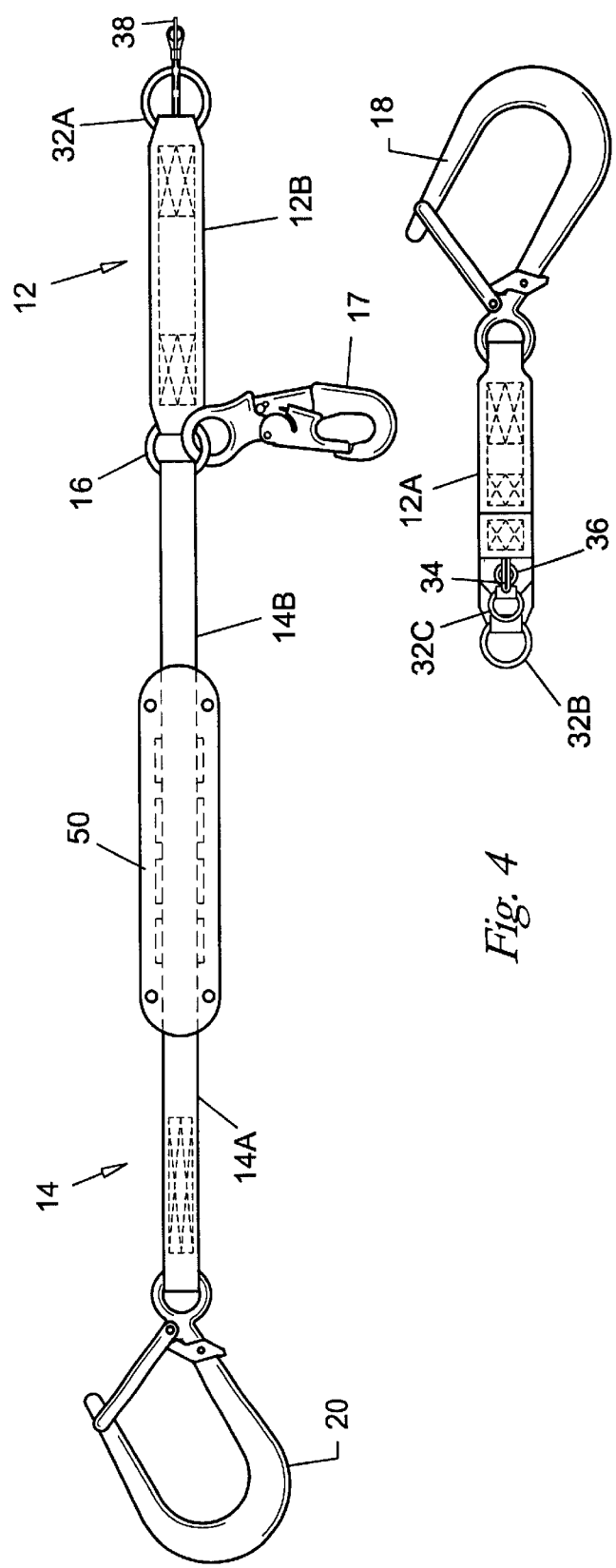
FIG. 4 depicts a top view thereof wherein the lanyard end portion is disconnected from the remaining portion of the apparatus.
Figure 6A:
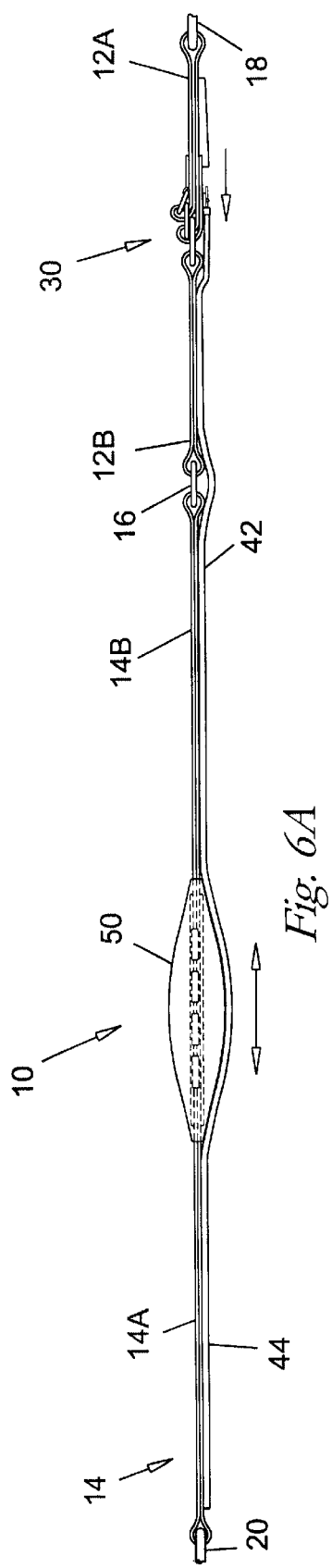
FIG. 6A is a partial side view of the lanyard apparatus illustrating activation of the emergency release mechanism by deployment of the limited slip mechanism.
Figure 6B:
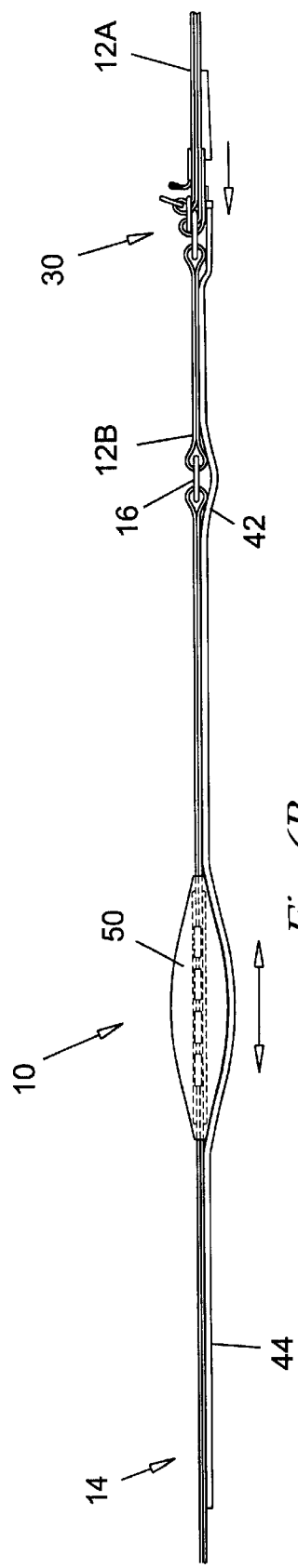
FIG. 6B is a partial side view thereof further illustrating activation of the emergency release mechanism.
Figure 5D:
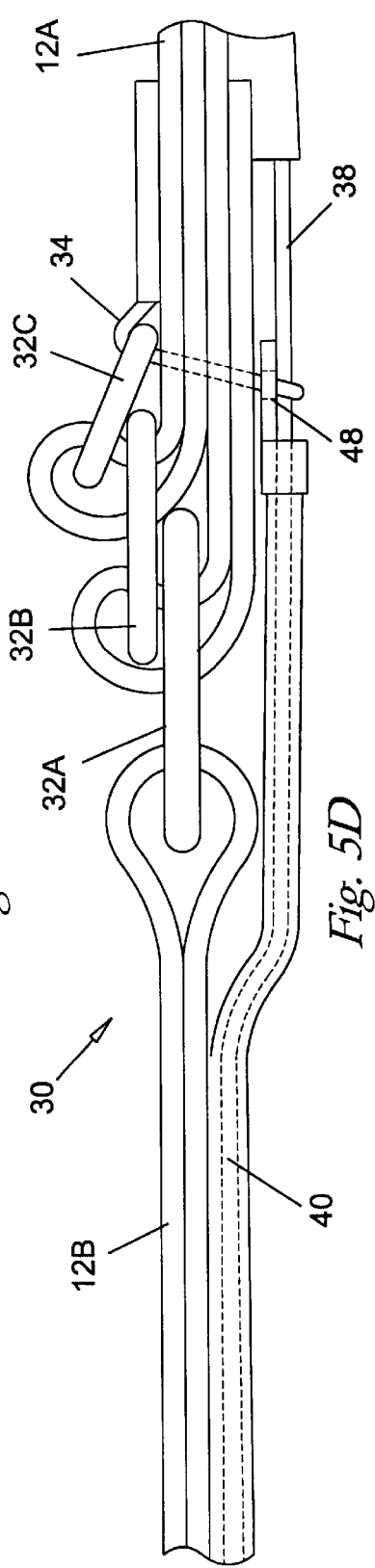
FIG. 5D is partial detail view of the connecting mechanism shown in FIG. 5A.

With reference now to the drawings, there is illustrated a preferred embodiment of an emergency release lanyard apparatus and method for using same to transfer loads between an airborne platform, such as a hovering helicopter, to an elevated location on a structure. FIG. 1 illustrates an emergency release lanyard apparatus, generally referenced as 10, for use with a transfer method disclosed herein. Lanyard apparatus 10 includes a first lanyard 12 and a second lanyard 14, each connected to a load-bearing ring 16. Ring 16 is preferably fabricated from metal and provides a connection point for attaching the lanyard apparatus to the safety harness (not shown) via a safety hook 17 or other equivalent connecting device. The safety harness may be a personal safety harness worn by a human load, or a cargo harness attached to a non-human load. Lanyard segments 12 and 14 may be fabricated from any suitable, flexible load bearing material, such as nylon straps, rope, cable, or equivalent load bearing member. Each lanyard 12 and 14 terminates in a free end fitted with a safety hook, which hooks are referenced as 18 and 20 respectively. Hooks 18 and 20 are preferably locking type hooks, such as ladder hooks or snap hooks, having a double-action locking feature for safety purposes. Specifically, the double-action locking mechanism is a safety feature that requires two separate and distinct manual actions to undo the hook thereby preventing the undesired or unintentional attachment/detachment of the hook. Hooks 18 and 20 are used to selectively attach the lanyard and load to points on a helicopter or structure during the transfer process as more fully disclosed herein. It should be noted, however, that while the preferred embodiment discloses the use of hooks, other suitable attachment devices, such as clamps, may be substituted therefore within the scope of the present invention.

Lanyard 12 incorporates a quick release mechanism, generally referenced as 30, which is adapted for activation by a tensional force applied to lanyard 14. Upon activation of the quick release mechanism the end portion of lanyard 12, generally referenced as segment 12A, is released from the remaining portion of lanyard segment 12, which remaining portion is generally referenced as segment 12B. Quick release mechanism 30 includes a releasable connection joining lanyard segments 12A and 12B. In a preferred embodiment, quick release mechanism 30 includes an interlocked series of rings, referenced as 32A, 32B and 32C, secured in an interlocked load-bearing configuration, joining lanyard segments 12A and 12B, by a loop 34 formed by parachute cord attached to one side of lanyard segment 12A and passing through a metal grommet 36 in lanyard segment 12A. Loop 34 is secured by a pin 38 removably inserted therethrough such that loop 34 secures rings 32A–C in a securely interlocked configuration capable of withstanding substantial loads. Pin 38 is connected to a first end of a cable 40, which is preferably slidably received within a conduit 42 secured to lanyard segment 12B. Conduit 42 terminates in a projecting eyelet 48. Cable 40 includes a second end 44 that is connected to lanyard segment 14, and particularly end segment 14A. Applying a nominal force to the second end 44 of cable 40 causes the cable to retract relative to conduit 42 and loop 34 thereby displacing pin 38 from loop 34 and allowing separation of lanyard segment 12A from segment 12B by disengagement of rings 32A–C.

Lanyard 14 includes an end portion 14A that is connected to the remaining portion of lanyard 14, referenced as 14B, via a limited slip/shock absorbing mechanism, generally referenced as 50. Limited slip mechanism 50 allows for limited extension of lanyard 14 upon application of a predetermined force. In a preferred embodiment, the limited slip mechanism comprises a shock-absorbing lanyard, such as is available from Descent Control, Inc. of Fort Smith, Ark. and/or Miller Fall Protection Products, Inc. of Franklin, Pa., however any suitable limited slip mechanism is considered within the scope of the present invention. Upon application of a sufficient force, such as the force that would be encountered if the rotorcraft attempts to pull away in an emergency situation when tethered to the structure, the limited slip mechanism would activate thereby allowing the length of lanyard 14 to extend. In a preferred embodiment, a force in excess of 500 lbs. is required to activate the limited slip mechanism whereby an additional length of lanyard is deployed. It should be noted, however, that the activation force may be adjusted (upward or downward) depending upon the nature and/or characteristics of the load and the external operation. An activation force of 500 lbs., however, has been found suitable for operations involving human loads, however, a higher (or lower) activation force may be used depending on the load and application. Extension of lanyard 14 causes activation of the quick release mechanism 30 on lanyard 12 as described hereinabove by movement of cable 40 and pin 38 from loop 34 thereby freeing the interlinked ring assembly, e.g. rings 32A–C, and allowing for separation of lanyard segments 12A and 12B.

In an alternate embodiment depicted in FIGS. 7A and 7B, the limited slip mechanism may comprise a breakaway link 60 in combination with a third lanyard segment 14C joining lanyard segments 14A and 14B. In this embodiment, the breakaway link 60 joins segments 14A and 14B in close proximity by linked connection with additional rings 62 and 64 attached to the respective end portions of lanyard segments 14A and 14B. In addition, lanyard segment 14C has opposing ends connected to ring 62 and 64 respectively. Breakaway link 60 is selected such that application of a predetermined force thereto results in separation of the link and extension of lanyard 14 by the length of segment 14C. It should be noted, that any other suitable mechanism that allows for limited extension of lanyard 14 in response to the application of a force of a predetermined threshold value so as to activate quick release 30 is considered within the scope of the present invention.

As previously noted, the second cable end 44 is connected to lanyard segment 14A. Accordingly, when a predetermined opposing force is applied to hooks 18 and 20, the limited slip mechanism 50 (or alternatively 60) activates thereby allowing lanyard 14 to extend. Extension of lanyard 14 causes cable 40 to slide within conduit 42 thereby removing pin 38 from loop 34. Once free, loop 34 no longer functions to maintain the connection between lanyard segments 12A and 12B thereby allowing the separation of lanyard section 12A from the remaining portions of the device 10. It should also be noted that the means for activating release 30, e.g. limited slip mechanism 50 or breakaway link 60, or an alternate means for activating release 30, may in an alternate embodiment, be incorporated on lanyard segment 12, and particularly on segment 12B, rather than on lanyard segment 14.

Figure 8:
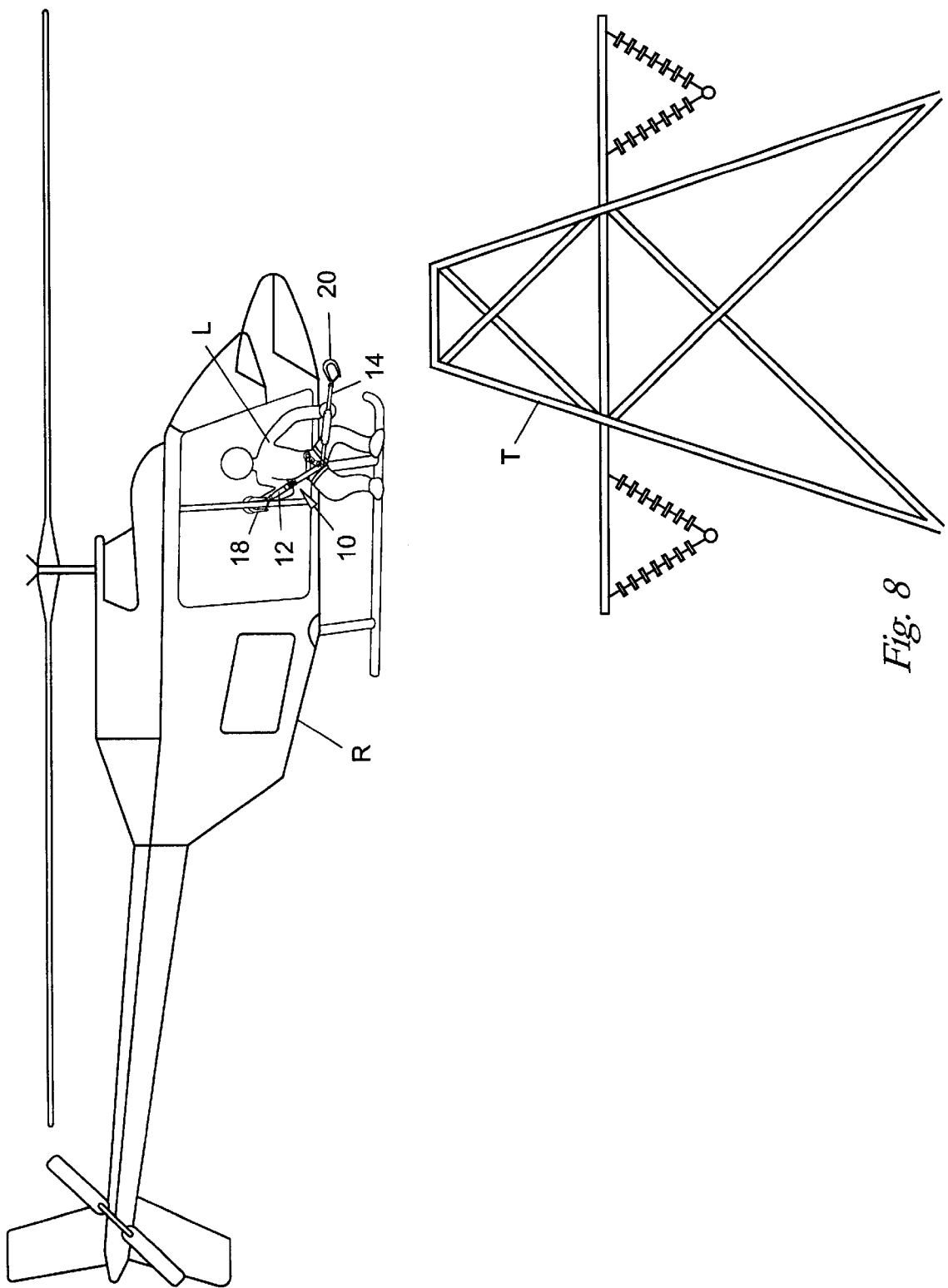
FIG. 8 depicts a human load connected to a rotorcraft prior to transfer.
Figure 9:
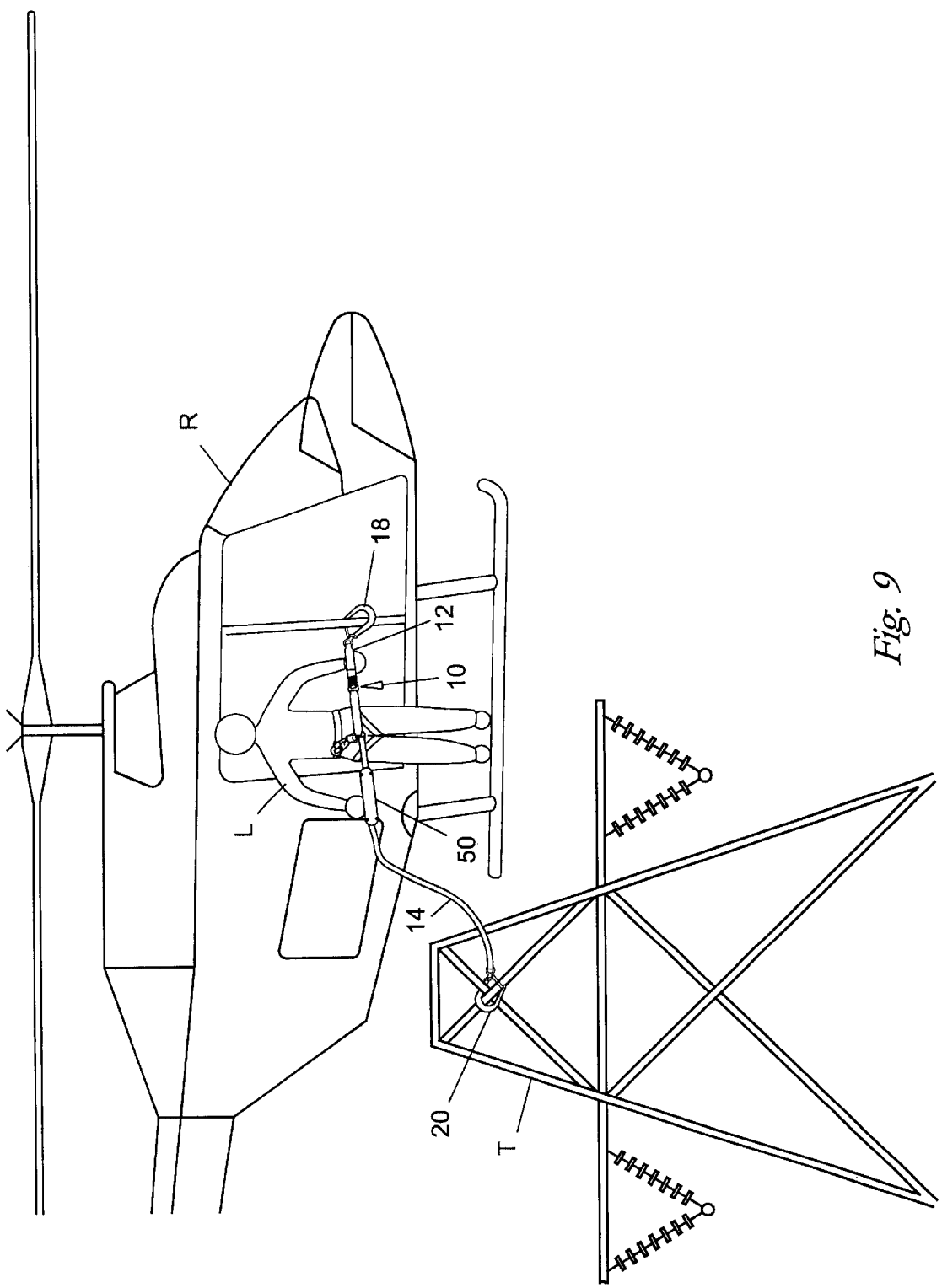
FIG. 9 depicts a human load connected to both the rotorcraft and an adjacent tower structure.
Figure 10:
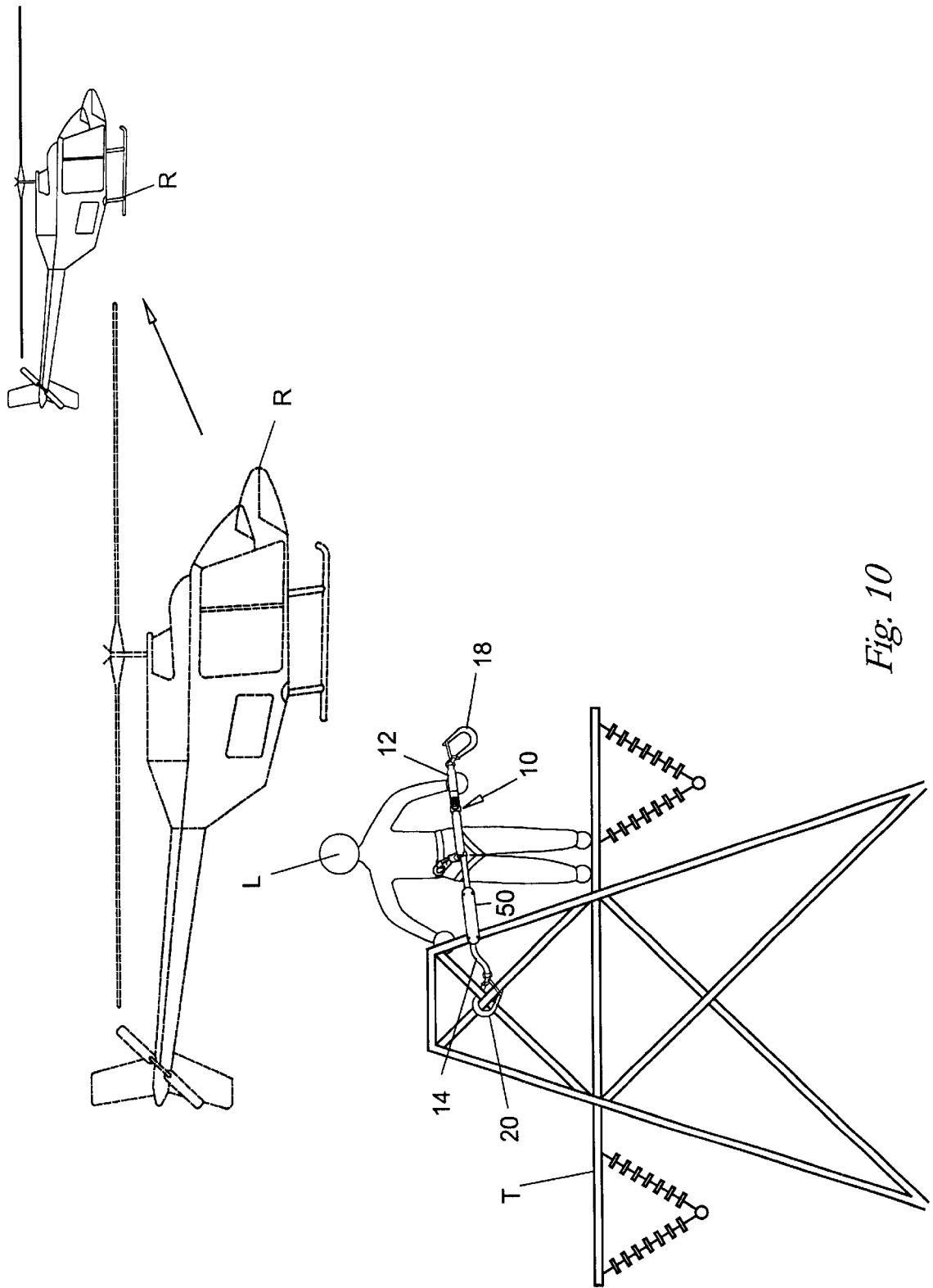
FIG. 10 depicts a human load after transfer to a tower structure.

As best depicted in FIGS. 8–11, the emergency release lanyard apparatus disclosed herein may be used in conjunction with the following method to safely transfer a load from a hovering rotorcraft to an adjacent structure. In accordance with the present invention, loads are transferred from an airborne rotorcraft, referenced as "R," to a structure, such as a tower "T," while providing fall protection for the load, referenced as "L," and emergency release capabilities for the aircraft. According to a preferred embodiment, a helicopter is adapted with an external platform configured for carrying a load external to the aircraft fuselage as seen in FIG. 8. The load is preferably prevented from falling from the helicopter by a suitable restraint, such as an FAA approved safety restraint (e.g. seat belt not shown) or one of said lanyards. The load is equipped with a safety harness and lanyard apparatus 10 having first and second lanyards 12 and 14. According to the method, a rotorcraft "R" hovers next to a structure "T," and safe transfer is accomplished by: (1) connecting a safety lanyard apparatus, having first and second lanyards, to the load; (2) securing the load to the rotorcraft with a safety restraint; (3) maneuvering the rotorcraft substantially adjacent to the structure; (4) attaching the free end of the first lanyard 12 to the rotorcraft via hook 18 (FIG. 8); (5) releasing any auxiliary safety restraint (e.g. seat belt); (6) attaching the free end of the second lanyard 14 to the structure via hook 20 (FIG. 9); (7) detaching the first lanyard from the rotorcraft; and (8) transferring the load to the structure (FIG. 10). When transferring from the structure to the helicopter the method is essentially reversed. It should be noted that while the present invention contemplates the use of an auxiliary safety restraint, such as an FAA approved seatbelt, the first and/or second lanyards of the present invention will function as equivalent substitutes to insure that the load is restrained from prior to takeoff through the time when the load is safely deposited onto a structure.

Figure 11:
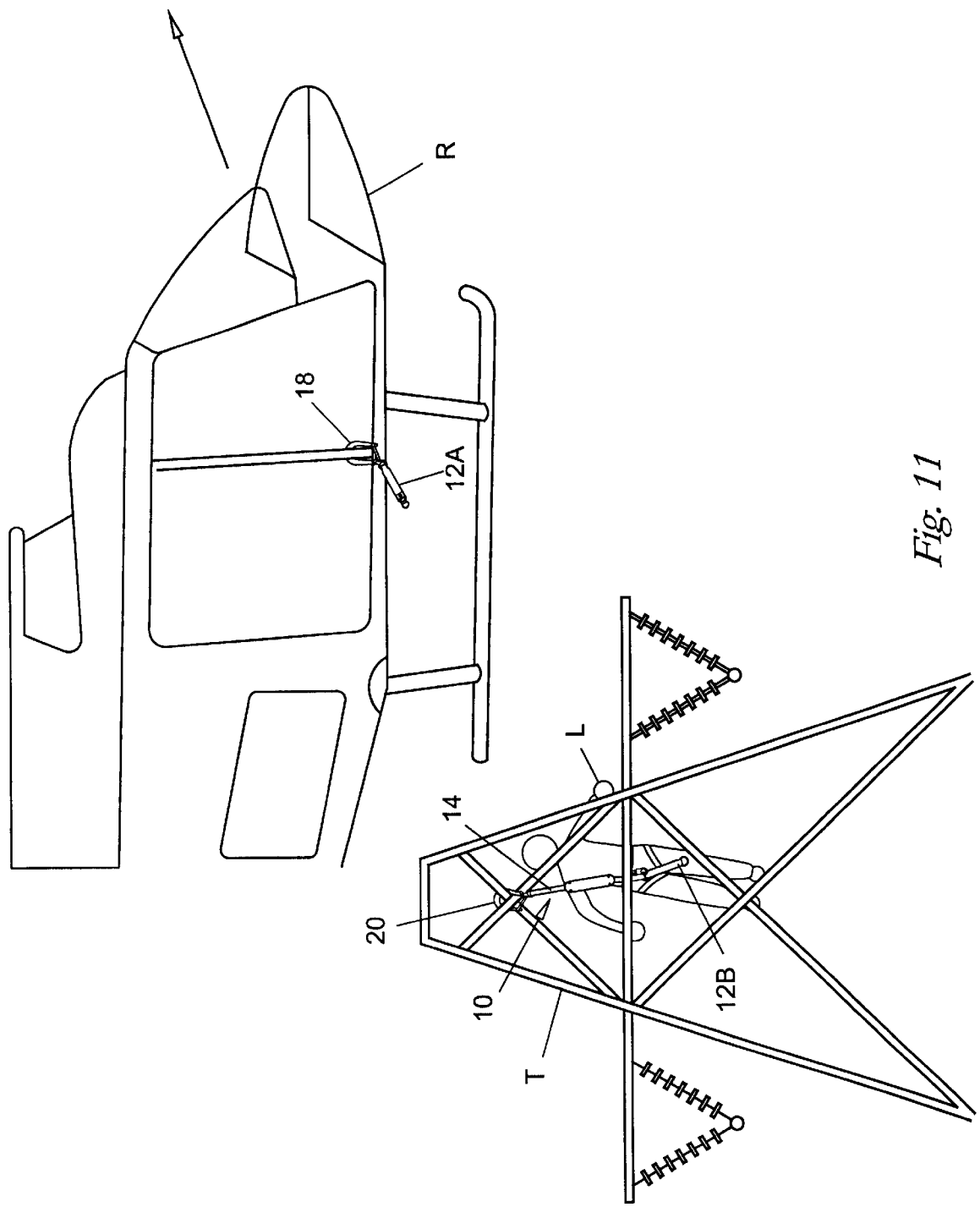
FIG. 11 depicts a human load suspended from a tower structure in an emergency release scenario.

The competing concerns of fall protection (for the load) and on-demand emergency release (for the aircraft) are each enabled by the emergency release lanyard 10. The lanyard apparatus provides total fall protection for the load throughout the transfer process without restricting or otherwise limiting available emergency flight options/maneuvers by incorporating an emergency release that automatically activates on demand. A significant aspect of the method disclosed herein involves maintaining complete fall protection for the load before, during, and after the transfer process without impairing the availability of emergency flight maneuvers for the helicopter as is the case with prior art methods. It should be noted that, according to the method disclosed herein, that the load is protected from accidental falling during all phases of the transfer. Specifically, fall protection is initially provided by an FAA safety restraint (e.g. seat belt or equivalent cargo restraint). During the next step in the process wherein the first lanyard 12 is attached to the aircraft, fall protection is provided by secured attachment of the lanyard segment 12 to a load bearing point on the helicopter; after which the FAA restraint may be removed. During the next step in the process wherein the second lanyard segment 14 is connected to the adjacent structure fall protection is provided by the second lanyard segment. It should be noted, as best depicted in FIG. 9, that during this phase of the transfer, e.g. when the first lanyard segment is attached to the helicopter and the second lanyard segment is attached to the structure, the helicopter is effectively tethered to the structure, and the load is tethered to both the helicopter and the structure. If an actual or perceived emergency dictates that the helicopter pilot execute an emergency pull-away maneuver, the lanyard apparatus is placed in tension. When the predetermined force is reached, the limited slip mechanism (50 or 60) of lanyard segment 14 activates thereby deploying an additional length of lanyard, which change in length activates the quick-release mechanism of lanyard segment 12 thereby releasing hook 18 and allowing the helicopter to depart while lanyard 14 functions to secure the load to the structure as depicted in FIG. 11. In the absence of an emergency, hook 18 is detached from the helicopter and the load is secured to the structure by lanyard 14 as seen in FIG. 10.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What I claim is:

1. A method for transferring a load from an airborne rotorcraft to a structure, said method including the steps of:

connecting a safety lanyard apparatus to the load, said lanyard apparatus having first and second lanyards, each of said first and second lanyards terminating in a free end;

said second lanyard including means for disconnecting the free end of said second lanyard, and said first lanyard including means for activating said means for disconnecting the free end of said second lanyard in response to a force greater than or equal to a predetermined threshold force applied to said first and second lanyard ends;

maneuvering the rotorcraft substantially adjacent to the structure;

attaching the free end of said first lanyard to the rotorcraft;

attaching the free end of said second lanyard to the structure;

detaching said first lanyard from the rotorcraft; and transferring the load to the structure.

2. A method for transferring a load from an from an airborne rotorcraft to a structure, said method including the steps of:

connecting a safety lanyard apparatus to the load, said safety lanyard apparatus including first and second lanyards, each of said first and second lanyards having one end connected to the load and an opposing free end, said first lanyard incorporating a means for releasing said free end thereof, said second lanyard incorporating means for activating said means for releasing in response to a predetermined tensional threshold force applied to said first and second lanyard ends;

securing the load to the rotorcraft with a safety restraint, which safety restraint is selected from one of said first or second lanyards or an auxiliary safety restraint;

maneuvering the rotorcraft substantially adjacent to the structure;

attaching the free end of said first lanyard to the rotorcraft;

releasing any auxiliary safety restraint;

attaching the free end of said second lanyard to the structure, whereby the application of a tensional force, greater than or equal to a predetermined threshold force, to said lanyard apparatus results in activation of said means for releasing thereby enabling separation of said free end of said first lanyard from said safety lanyard apparatus;

detaching said first lanyard from the rotorcraft; and transferring the load to the structure.

3. A method for transferring a load from an airborne rotorcraft to a structure according to claim 2, wherein said means for selective rapid release comprises:

a releasable mechanical connection releasably connecting said first lanyard free end to the remaining portion of said first lanyard, and means for activating said releasable mechanical connection mean in response to a predetermined tensional force;

said releasable connection maintained in a connected configuration wherein said first lanyard free end is connected to said first lanyard by a removable securing pin, whereby the application of a predetermined tensional force to said opposing ends of said lanyard apparatus causes said means for activating to remove said securing pin from said releasable connection thereby enabling the automatic releasable separation of said first lanyard free end.

4. A method for transferring a load from an airborne rotorcraft to a structure according to claim 3, wherein said means for activating said releasable mechanical connection in response to a predetermined tensional force comprises a limited slip device.

5. A method for transferring a load from an airborne rotorcraft to a structure according to claim 3, wherein said means for activating said releasable mechanical connection in response to a predetermined tensional force comprises a break away link.

6. A method for transferring a load from an airborne rotorcraft to a structure while providing fall protection for the load and emergency release capabilities for the rotorcraft, said method including the steps of:

connecting a safety lanyard apparatus to the load, said safety lanyard apparatus including first and second lanyards each terminating in a free end, said first lanyard including means for releasing an end portion thereof in response to a force greater than or equal to a predetermined threshold value applied to said first and second lanyard free ends;

securing the load to the rotorcraft with a safety restraint, said safety restraint selected from at least one of said first or second lanyards or an auxiliary safety restraint;

maneuvering the rotorcraft substantially adjacent to the structure;

attaching the free end of said first lanyard to the rotorcraft;

releasing any auxiliary safety restraint;

attaching the free end of said second lanyard to the structure, whereby the application of a tensional force, greater than or equal to a predetermined threshold level, to said lanyard apparatus activates said means for releasing said free end of said first lanyard whereby the load is secured to the structure by said second lanyard;

detaching said first lanyard from the rotorcraft; and transferring the load to he structure.

7. A method for transferring a load from an airborne rotorcraft to a structure according to claim 6, wherein means for releasing includes means responsive to a predetermined tensional force for activating a quick release mechanism connecting said first lanyard end to said first lanyard.

8. A method for transferring a load from an airborne rotorcraft to a structure according to claim 7, wherein said quick release mechanism comprises a mechanical connection having a connected configuration, maintained during all times wherein the tensional forces applied to said lanyard apparatus are less than said predetermined threshold level, and a disconnected configuration, wherein said first lanyard end is disconnected from said first lanyard automatically in response to said tensional force.

9. A method for transferring a load from an airborne rotorcraft to a structure according to claim 7, wherein said means responsive to a predetermined tensional force comprises a limited slip device connected to said second lanyard.

10. A method for transferring a load from an airborne rotorcraft to a structure according to claim 7, wherein said means responsive to a predetermined tensional force comprises a break away link.

* * * * *